United States Patent
Lee et al.

(10) Patent No.: US 11,991,646 B2
(45) Date of Patent: May 21, 2024

(54) POWER MANAGEMENT APPARATUS BASED ON USER PATTERN AND METHOD

(71) Applicants: SKAICHIPS CO., LTD., Suwon-si (KR); Research & Business Foundation Sungkyunkwan University, Suwon-si (KR)

(72) Inventors: Kang Yoon Lee, Seoul (KR); Jong Wan Jo, Suwon-si (KR); Young Gun Pu, Suwon-si (KR); Dong Soo Park, Suwon-si (KR); Joon Hong Park, Suwon-si (KR); Jae Bin Kim, Suwon-si (KR); Yun Gwan Kim, Suwon-si (KR)

(73) Assignees: SKAICHIPS CO., LTD., Suwon-si (KR); Research & Business Foundation Sungkyunkwan University, Suwon-si (KR)

( * ) Notice: Subject to any disclaimer, the term of this patent is extended or adjusted under 35 U.S.C. 154(b) by 351 days.

(21) Appl. No.: 17/508,095

(22) Filed: Oct. 22, 2021

(65) Prior Publication Data

US 2022/0132439 A1    Apr. 28, 2022

(30) Foreign Application Priority Data

Oct. 22, 2020   (KR) .................. 10-2020-0137742

(51) Int. Cl.
*H04W 52/28* (2009.01)
*H04W 24/08* (2009.01)

(52) U.S. Cl.
CPC ........... *H04W 52/28* (2013.01); *H04W 24/08* (2013.01)

(58) Field of Classification Search
CPC ... H04W 52/28; H04W 24/08; H04W 52/223; H04W 52/0258; H04W 52/0261; H02M 3/157; H02M 1/0003; G06N 20/00
See application file for complete search history.

(56) References Cited

U.S. PATENT DOCUMENTS

| | | | |
|---|---|---|---|
| 2014/0235301 A1* | 8/2014 | Segev | ........... H02M 3/156 455/574 |
| 2018/0206133 A1* | 7/2018 | Venkatraman | .......... H04L 47/29 |
| 2019/0302819 A1* | 10/2019 | Hu | ............ G05F 1/575 |
| 2020/0073467 A1* | 3/2020 | King | ........... G06F 1/3228 |
| 2021/0124404 A1* | 4/2021 | Mohammad | ........ G06F 1/3206 |

FOREIGN PATENT DOCUMENTS

| | | |
|---|---|---|
| EP | 3 667 887 A1 | 6/2020 |
| KR | 10-2020-0084454 A | 7/2020 |

OTHER PUBLICATIONS

Korean Office Action issued on Apr. 4, 2022, in the corresponding Korean Application No. 10-2020-0137742 (4 pages in Korean).

* cited by examiner

*Primary Examiner* — Yuwen Pan
*Assistant Examiner* — Fatuma G Sherif
(74) *Attorney, Agent, or Firm* — NSIP Law

(57) ABSTRACT

A power management apparatus, includes an artificial intelligence (AI) controller configured to monitor a user pattern, based on frequency band selection information of all users using a base station, to predict the user pattern, and a DC-DC converter configured to output a supply voltage based on the predicted user pattern.

8 Claims, 6 Drawing Sheets

[FIG. 1]
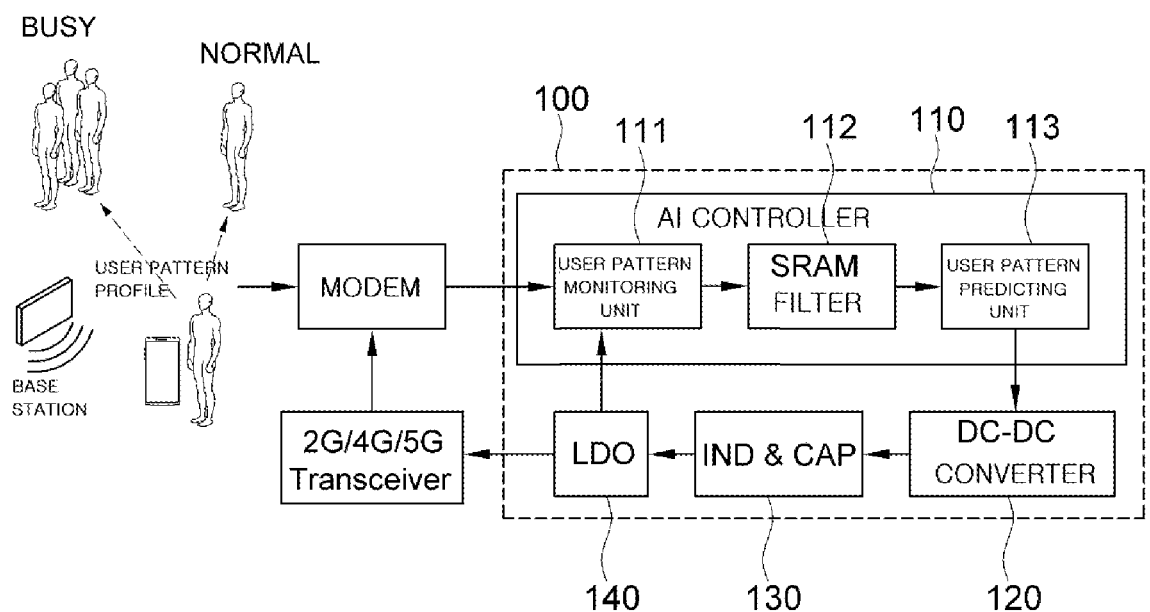

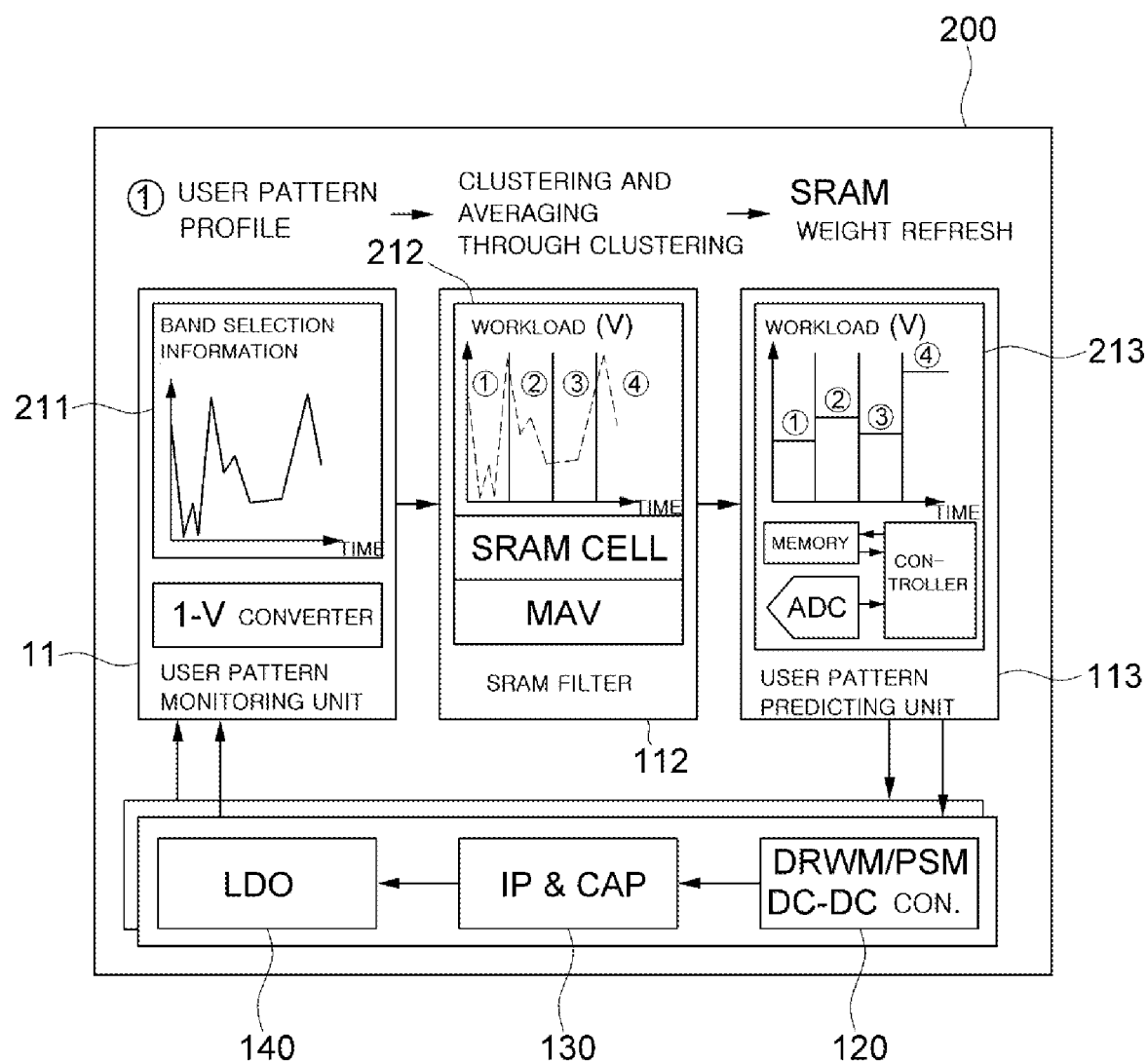
[FIG. 2]

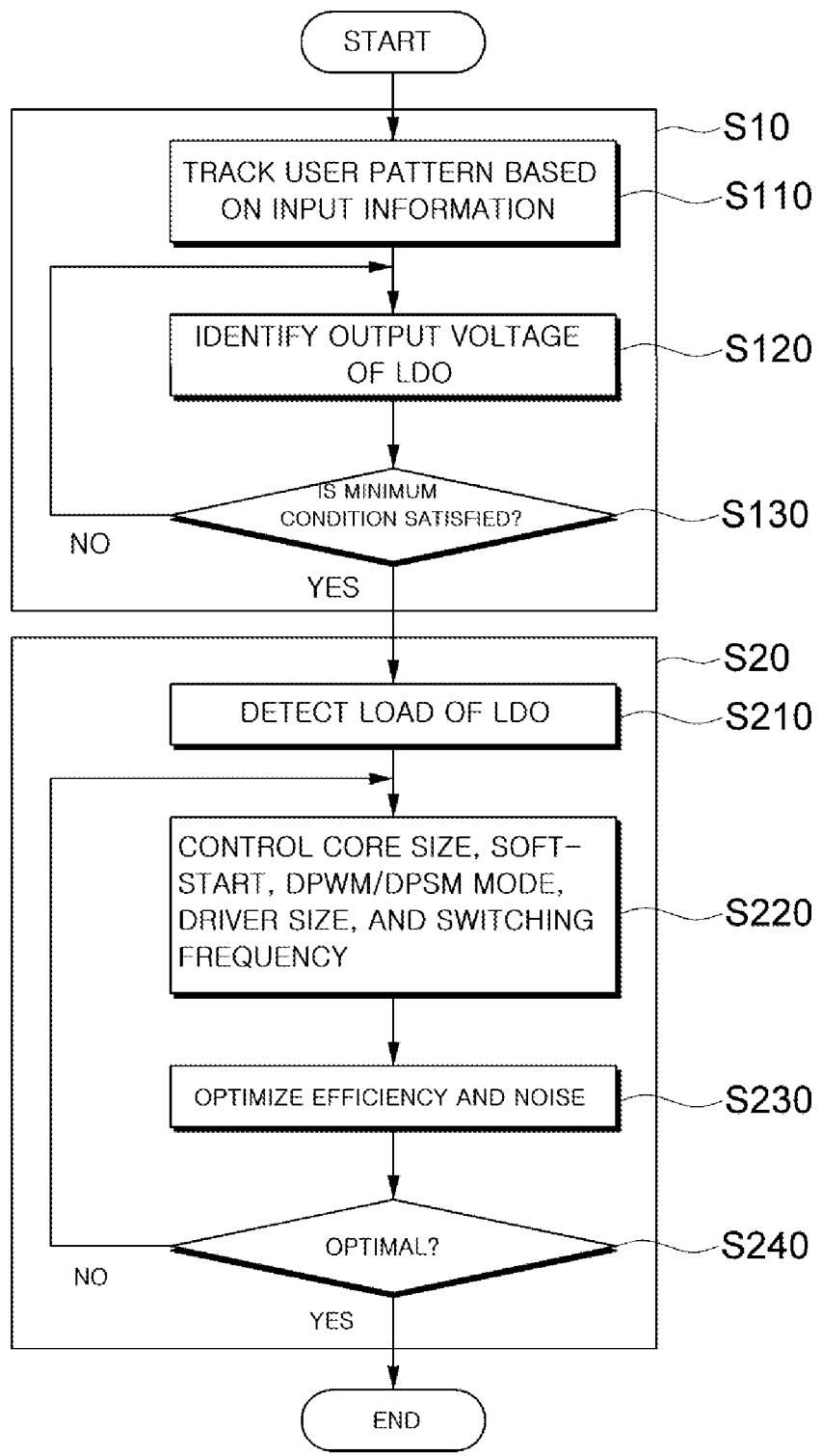
[FIG. 3]

[FIG. 4]
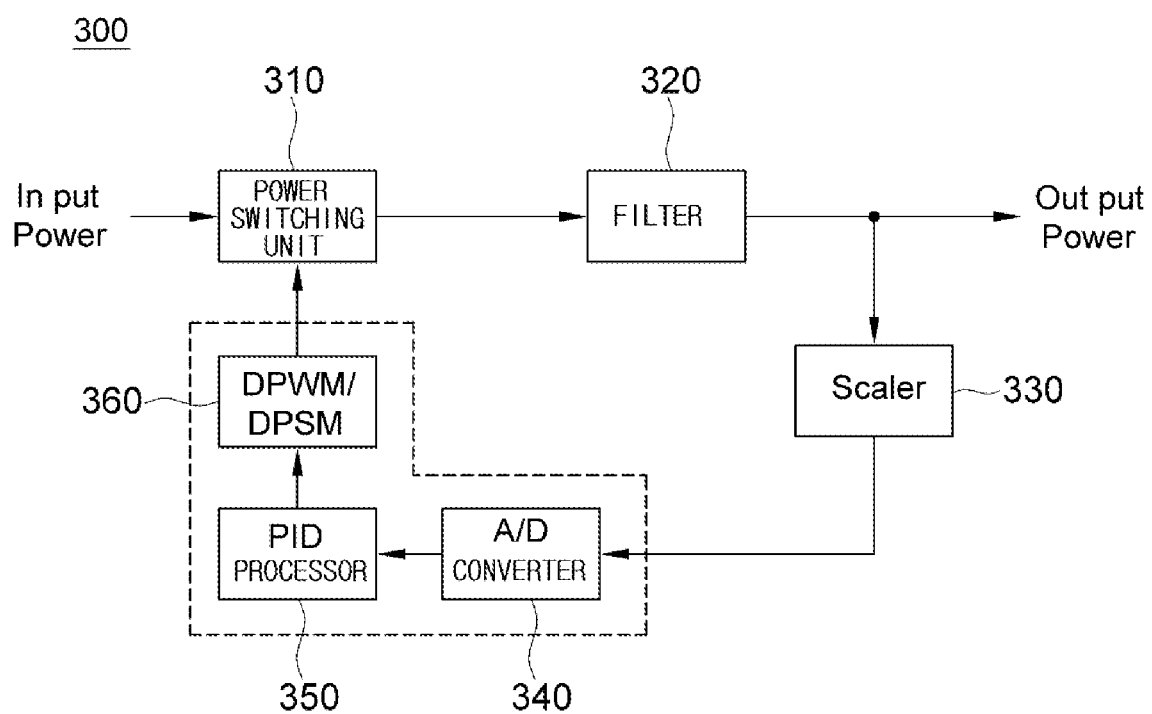

[FIG. 5]
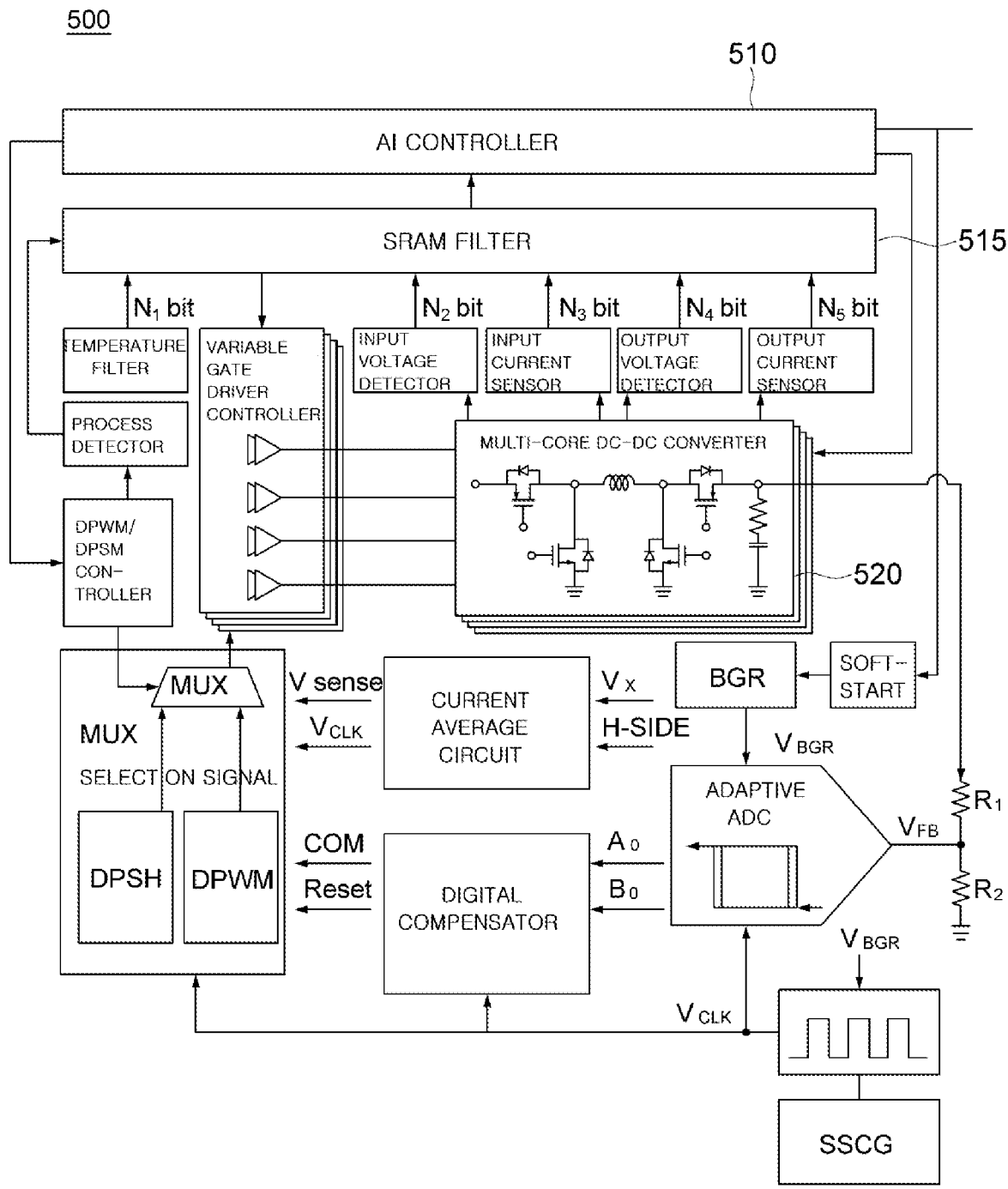

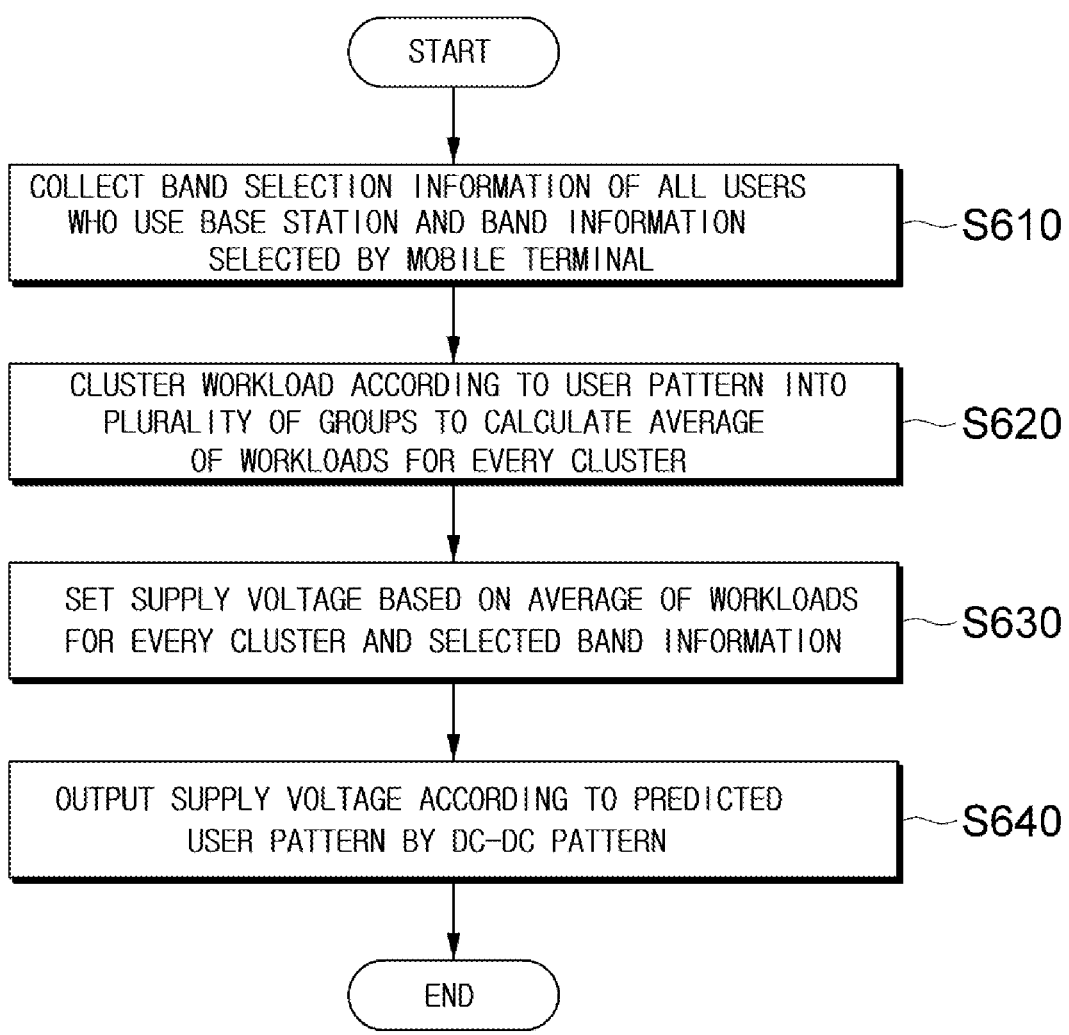
[FIG. 6]

POWER MANAGEMENT APPARATUS
BASED ON USER PATTERN AND METHOD

CROSS-REFERENCE TO RELATED
APPLICATIONS

This application claims the benefit under 35 USC 119(a) of Korean Patent Application No. 10-2020-0137742 filed on Oct. 22, 2020, in the Korean Intellectual Property Office, the entire disclosure of which is incorporated herein by reference for all purposes.

BACKGROUND

1. Field

The present disclosure relates to a power management apparatus based on a user pattern and a method thereof.

2. Description of the Related Art

Recently, in a 5G communication system, low noise, low power, and size reduction are becoming an issue. Therefore, there is a trade-off between the low noise and the low power desired for the 5G communication system.

It is difficult to implement a high data rate in the current 5G communication system. However, a high data rate is not always desired. To solve this problem, it is desired to apply a low noise/low power circuit desired for the 5G communication system by optimal frequency change and power supply according to a circumstance.

The 5G communication system technique of the related art is a low noise technique for a high data rate so that the power consumption and the area are high. Therefore, to solve the problems, a method for minimizing the heat generation according to a circumstance while achieving a low noise technique is desired by selecting an optimal frequency and supplying an optimal power.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power management apparatus, includes an artificial intelligence (AI) controller configured to monitor a user pattern, based on frequency band selection information of all users using a base station, to predict the user pattern, and a DC-DC converter configured to output a supply voltage based on the predicted user pattern.

The power management apparatus may further include a memory configured to store instructions. The AI controller may be further configured to execute the instructions to configure the AI controller to monitor the user pattern, based on the frequency band selection information of all the users using the base station, to predict the user pattern.

The AI controller may include a user pattern profiler configured to collect the frequency band selection information of all the users using the base station and frequency band information selected by a mobile terminal, a static random access memory (SRAM) filter configured to cluster workloads based on the user pattern into a plurality of groups to calculate an average of the workloads for every cluster, and a user pattern predictor configured to set a supply voltage based on the average of the workloads for every cluster and the selected frequency band information.

The AI controller may be further configured to detect a load of a low-dropout (LDO) to control a core size, a soft-start time, a discontinuous Pulse-width modulation/digital power system management (DPWM/DPSM) mode, a gate driver size, and a switching frequency to track a minimum supply voltage satisfying a predetermined minimum noise performance based on an AI algorithm.

When the load of the LDO is larger than a predetermined reference, the DC-DC converter may be further configured to operate in a DPWM mode, and when the load of the LDO is smaller than the predetermined reference, operate in a DPSM mode.

In another general aspect, a power management method, includes predicting a user pattern using an AI controller by monitoring the user pattern based on frequency band selection information of all users using a base station, and outputting, using a DC-DC converter, a supply voltage according to the predicted user pattern.

The predicting of the user pattern may include collecting the frequency band selection information of all the users using the base station and frequency band information selected by a mobile terminal, clustering workloads according to the user pattern into a plurality of groups to calculate an average of the workloads for every cluster, and setting a supply voltage based on the average of the workloads for every cluster and the selected frequency band information.

The setting of a supply voltage may further include detecting a load of a low-dropout (LDO) to control a core size, a soft-start time, a discontinuous Pulse-width modulation/digital power system management (DPWM/DPSM) mode, a gate driver size, and a switching frequency to track a minimum supply voltage satisfying a predetermined minimum noise performance based on an AI algorithm.

In the outputting of the supply voltage according to the predicted user pattern, when a load of the LDO is larger than a predetermined reference, an operation mode may be a DPWM mode, and when the load of the LDO is smaller than the predetermined reference, the operation mode may be a DPSM mode.

A non-transitory computer-readable storage medium storing instructions that, when executed by the AI controller, may configure the AI controller to perform the method above.

Other features and aspects will be apparent from the following detailed description, the drawings, and the claims.

BRIEF DESCRIPTION OF THE DRAWINGS

FIG. 1 is a conceptual view of an example of a power management apparatus based on a user pattern according to one or more embodiments.

FIG. 2 is a block diagram of an example of a power management apparatus based on a user pattern according to one or more embodiments.

FIG. 3 is a flowchart of an example of a user pattern tracking method according to one or more embodiments.

FIG. 4 is a conceptual view of an example of a DC-DC converter according to one or more embodiments.

FIG. 5 is a circuit diagram of an example of a power management apparatus based on a user pattern according to one or more embodiments.

FIG. 6 is a flowchart of an example of a power management method based on a user pattern according to one or more embodiments.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The present disclosure provides a power management apparatus and method based on a user pattern which detects a workload by monitoring a usage pattern of a user and then checks power and a frequency desired for the user utilizing an I-V converter and change power and frequency by the fastest method.

Further, the power management apparatus and method based on a user pattern supply an optimal low power according to a change in a workload to solve the temperature rising problem and wasted power problem of a device.

FIG. 1 is a conceptual view explaining a power management apparatus based on a user pattern according to one or more embodiments. FIG. 2 is a block diagram explaining a power management apparatus based on a user pattern, according to one or more embodiments.

Referring to FIGS. 1 and 2, the power management apparatus 100 based on a user pattern according to one or more embodiments may include an artificial intelligence (AI) controller 110, a direct current-direct current (DC-DC) converter 120, an inductor and capacitor 130, and a low-dropout (LDO) 140. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

The power management apparatus 100 may transmit and receive signals via a modem and a transceiver with a base station. In addition, the modem may process a baseband signal which is transmitted and received by a wireless communication device.

The AI controller 110 predicts a user pattern using an AI algorithm based on input band selection information and sets a supply voltage according to the predicted user pattern. Here, the band may be 2G, 3G, 4G, and 5G communication frequency bands, but is not limited thereto.

Generally, as the mobile device moves, the base station is changed. Whenever the base station is changed, an available frequency band is changed, and a mobile device user selects an arbitrary band depending on a frequency selected according to a frequency band that is changed whenever the base station is changed. Therefore, the AI controller 110 sets a supply voltage based on a selected band and band information divided from the entire frequency.

The AI controller 110 may include a user pattern monitor 111, a static random access memory (SRAM) filter 112, and a user pattern predictor 113.

The user pattern monitor 111 collects patterns of all the users who use the base station whenever the base station is changed. As seen from graph 211 illustrated in FIG. 2, the collected information may be band selection information according to a time. The user pattern monitor 111 may transmit the collected information to the SRAM filter 112 via the I-V converter. A power and a frequency desired for the user are confirmed utilizing the I-V converter.

The SRAM filter 112 clusters the user patterns with a predetermined time interval and calculates an average of workloads for every cluster. As seen from graph 212 illustrated in FIG. 2, workloads according to a time are clustered. It is understood from the graph 212 of FIG. 2 that the workloads are divided into four clusters. In one example, the workloads may be clustered with respect to a change of the pattern of the workload according to a time.

The user pattern predictor 113 predicts the user pattern based on an average of the workloads for every cluster according to a time and sets a supply voltage according thereto. As seen from a graph 213 illustrated in FIG. 2, the user pattern may be predicted based on an average load of the workloads of each cluster which is clustered according to the time.

When a workload according to the predicted user pattern is low, the user pattern predictor 113 sets a low power. Conversely, when the average load of the workloads is relatively high, the user pattern predictor 113 determines that many users desire a band to supply high power. When the average load of the workloads is relatively low, it determines that a few users desire a band to supply a low power. For example, in a graph 213 of FIG. 2, a cluster section 1 in which an average load of the workload is low is set to output power lower than that in a cluster section 4 in which an average load of the workload is high.

According to one or more embodiments, the user pattern predictor 113 may include a memory, a controller, and an analog to digital converter (ADC). The memory stores information to allow the user pattern predictor 113 to predict a user pattern and set a supply power based on the predicted pattern. The controller is driven to allow the user pattern predictor 113 to set a low power when the workload is low according to a predicted user pattern, and the ADC converts input analog information into digital information.

The DC-DC converter 120 supplies electric energy according to a set supply voltage. The DC-DC converter 120 uses a discontinuous pulse-width modulation (DPWM) mode or a digital power system management (DPSM) mode and uses a high switching frequency or a low frequency as a switching frequency to achieve an optimal efficiency according to a workload in accordance with the set supply voltage.

The DC-DC converter 120 may employ the DPWM for a heavy load and the DPSM for a light load.

The DC-DC converter 120, the inductor and capacitor 130, and the low dropout (LDO) 140 may be considered a power adjuster. The DC-DC converter 120 supplies an output signal to the inductor and capacitor 130. The inductor and capacitor 130 supplies an output signal to the LDO 140. The LDO 140 supplies an output signal to the AI controller 110. The power adjuster adjusts the supply power to control the power according to the setting according to the user pattern of the AI controller 110.

FIG. 3 is a flowchart of an example of a user pattern tracking method according to one or more embodiments.

The user pattern tracking method may be roughly divided into an initial setting operation S10 and an optimizing operation S20.

First, the initial setting operation S10 will be described.

According to one or more embodiments, a settling time is minimized in the initial setting operation S10. The settling time refers to a time until an output voltage is stabilized after supplying an input power at the initial driving of the device.

In operation S110, the AI controller tracks the user pattern based on the input information. At this time, the input information may be transmitted utilizing the modem. For example, information indicating whether the band has many or few users is received utilizing the modem.

In operation S120, the AI controller identifies an output voltage of the LDO depending on whether the band has many users or few users. An output voltage represents the output voltage of the LDO according to a control value trained according to a load of the LDO by a simulation according to the AI algorithm of the related art. At this time, in the initial setting operation S10, all the remaining values are set so that a voltage of the LDO is fast settled.

In operation S120, when the condition set in operation S110 satisfies a predetermined minimum condition (a trained control value), a sequence proceeds to an optimizing operation S20. Conversely, when the condition set in operation S110 does not satisfy the predetermined minimum condition, a sequence returns to operation S120.

Next, the optimizing operation S20 by the AI controller will be described.

In the optimizing operation S20 by the AI controller, a load of the LDO is detected to track a value for an efficiency transmitted to a transceiver and noise optimization by controlling a core size, a soft-start time, a DPWM/DPSM mode, a gate driver size, and a switching frequency.

To be more specific, in operation S210, the AI controller receives data from a connected component. For example, the AI controller identifies a used current amount to detect a load of the LDO.

In operation S220, the AI controller generates a signal for controlling a core size, soft-start, a DPWM/DPSM mode, a driver size, and a switching frequency based on the load of the LDO. The signal for controlling the core size, the soft-start, the DPWM/DPSM mode, the driver size, and the switching frequency may be a value derived by the artificial intelligence algorithm.

Operations S230 to S240 are repeated to perform the efficiency optimization and the noise optimization by control according to the core size, the soft-start, the DPWM/DPSM mode, the driver size, and the switching frequency signal. The control according to the core size, the soft-start, the DPWM/DPSM mode, the driver size, and the switching frequency signal is performed using a known technique so that a detailed description thereof will be omitted.

By doing this, even though in the related art, a larger number of times of coarse tuning is desired, according to an example, an optimal setting value for a frequency composing device may be output utilizing only one initial setting and two times of artificial intelligence algorithm. Further, a method for processing a large number of data using the artificial intelligence algorithm at one time is used to perform the first tuning based on the existing simulation value, and the user pattern prediction result and data output thereafter is added to perform second tuning. By doing this, a settling time is shortened compared with the tuning of the related art, and efficiency and noise optimization may be achieved. The efficiency optimization may minimize the amount of meaningless heat generated in the device, and the noise optimization may achieve an optimal value desired for the 2G, 4G, and 5G communication systems.

FIG. 4 is a conceptual view of an example of a DC-DC converter according to one or more embodiments.

Referring to FIG. 4, the DC-DC converter 300 may include a power switcher 310, a filter 320, a scaler 330, an A/D converter 340, a PID processor 350, and a DPWM/DPSM 360.

The power switcher 310 adjusts a supply voltage according to a signal set by the AI controller (110 in FIG. 1).

According to one or more embodiments, the power switcher 310 may include a capacitor for a control voltage and adjust a magnitude of a control voltage applied at both ends of the capacitor for control voltage by charging by supplying charges to the capacitor for control voltage or discharging by supplying a discharging path.

The filter 320 removes a ripple component due to the switching to apply a filtered control voltage to the scaler 330.

According to one or more embodiments, the filter 320 is a low-pass filter and may perform low pass filtering (LPF).

The scaler 330 increases or decreases a voltage according to a setting value for the efficiency and noise optimization by the AI controller (110 in FIG. 1) to apply the voltage to the A/D converter 340.

Here, the A/D converter 340, the PID processor 350, and the DPWM/DPSM 360 may be referred to as a digital controller.

The A/D converter 340 converts an analog signal into a digital signal to be a digital controllable value. By doing this, unlike the existing analog method, a circuit that is resistant to the nose may be provided.

The AD converter changes a duty in proportion to an output voltage level based on a digitally converted signal by the PID processor 350 and the DPWM/DPSM 360.

The DPWM/DPSM 360 operates in the DPWM mode at a high load and operates in the DPSM mode at a low load and transmits the output signal to the power switcher 310.

By doing this, the speed for finding the desired supply power may be reduced.

FIG. 5 is a circuit diagram of an example of a power management apparatus based on a user pattern according to one or more embodiments.

The power management apparatus 500 may dispose the artificial intelligence (AI) controller 510, the SRAM filter 515, and the DC-DC converter 520 on a chip. The chip may further include a plurality of sensors and devices. For example, the plurality of sensors may be a temperature sensor and a current sensor.

The SRAM filter 515 generates a control bit desired to adjust an element characteristic using the input weight to output the control bit to the AI controller 510. Here, there is a plurality of weights. For example, the weights may include a first weight $N_1$ bit according to temperature sensing of the temperature sensor disposed in the circuit, a second weight $N_2$ bit according to input voltage detection of an input voltage detector, a third weight $N_3$ bit according to current sensing of the input current sensor, a fourth weight $N_4$ bit according to output voltage detection of an output voltage detector, and a fifth weight $N_5$ bit according to current sensing of the output current sensor.

The output of the SRAM filter 515 is transmitted to the DC-DC converter 520. A variable gate driver controller is connected between the SRAM filter 515 and the DC-DC converter 520 to control an output value of the DC-DC converter 520 according to an output of the SRAM filter 515.

The AI controller 510 receives the signal from the SRAM filter 515 to output a mode control signal, a core size control signal, a soft-start control signal, and a driver size control signal.

The AI controller 510 transmits the mode control signal to the DPWM/DPSM mode controller to select any one of the DPWM mode and the DPSM mode.

The efficiency may be calculated by measuring an input voltage and an input current measured by an input current sensor and an input voltage detector provided at an input terminal and an output terminal of the DC-DC converter 120, respectively, and calculating a ratio of the input/output powers by the output voltage and the output current values.

In the meantime, a system that includes the inductor and the capacitor mounted in the chip to respond for information changed after tracking the user pattern at high speed and reducing the size may be configured.

FIG. 6 is a flowchart of an example of a power management method based on a user pattern according to one or more embodiments.

In operation S610, band selection information of all the users who use the base station and band information selected by a mobile terminal are collected.

In operation S620, the workload according to the user pattern is clustered into a plurality of groups to calculate an average of the workloads for every cluster.

In operation S630, the user pattern is predicted based on the average of the workloads for every cluster, and the supply voltage is set based on the selected band information.

In operation S640, the DC-DC converter may output the supply voltage according to the predicted user pattern.

According to one or more embodiments, in the 5G communication system, the power is adjusted according to the situation without consistently consuming a high power for the low nose, so that the waste of resources is prevented and the performance degradation of the device due to the heat generated in the device is solved.

Further, as an effect of the method for adjusting the power and finding an optimal frequency for a low nose according to the circumstance, the heat generation problem of the device is solved, and the reliability is guaranteed.

Further, in the feedback system, which is used after detecting the surrounding environment, a feedback system is implemented in an integrated circuit to reflect the user's environment, and the speed of finding an optimal noise characteristic is increased by using the AI algorithm.

The power management apparatus 100, AI controller 110, DC-DC converter 120, 300, inductor and capacitor 130, low-dropout (LDO) 140, user pattern monitor 111, SRAM filter 112, user pattern predictor 113, power switcher 310, filter 320, scaler 330, A/D converter 340, PID processor 350, and DPWM/DPSM 360 in FIGS. 1-6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microcomputer, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A power management apparatus, comprising:
   an artificial intelligence (AI) controller configured to monitor a user pattern, based on frequency band selection information of all users using a base station, to predict the user pattern; and
   a DC-DC converter configured to output a supply voltage based on the predicted user pattern, wherein the AI controller is further configured to detect a load of a low-dropout (LDO) to control a core size, a soft-start time, a discontinuous Pulse-width modulation/digital power system management (DPWM/DPSM) mode, a gate driver size, and a switching frequency to track a minimum supply voltage satisfying a predetermined minimum noise performance based on an AI algorithm.

2. The power management apparatus of claim 1, further comprising a memory configured to store instructions,
wherein the AI controller is further configured to execute the instructions to configure the AI controller to monitor the user pattern, based on the frequency band selection information of all the users using the base station, to predict the user pattern.

3. The power management apparatus of claim 1, wherein the AI controller comprises:
a user pattern profiler configured to collect the frequency band selection information of all the users using the base station and frequency band information selected by a mobile terminal;
a static random access memory (SRAM) filter configured to cluster workloads based on the user pattern into a plurality of groups to calculate an average of the workloads for every cluster; and
a user pattern predictor configured to set a supply voltage based on the average of the workloads for every cluster and the selected frequency band information.

4. The power management apparatus of claim 1, wherein when the load of the LDO is larger than a predetermined reference, the DC-DC converter is further configured to operate in a DPWM mode, and when the load of the LDO is smaller than the predetermined reference, the DC-DC converter is further configured to operate in a DPSM mode.

5. A power management method, comprising:
predicting a user pattern using an artificial intelligence (AI) controller by monitoring the user pattern based on frequency band selection information of all users using a base station; and
outputting, using a DC-DC converter, a supply voltage according to the predicted user pattern,
wherein the AI controller is configured to detect a load of a low-dropout (LDO) to control a core size, a soft-start time, a discontinuous pulse-width modulation/digital power system management (DPWM/DPSM) mode, a gate driver size, and a switching frequency to track a minimum supply voltage satisfying a predetermined minimum noise performance based on an AI algorithm.

6. The power management method of claim 5, wherein the predicting of the user pattern comprises:
collecting the frequency band selection information of all the users using the base station and frequency band information selected by a mobile terminal;
clustering workloads according to the user pattern into a plurality of groups to calculate an average of the workloads for every cluster; and
setting a supply voltage based on the average of the workloads for every cluster and the selected frequency band information.

7. The power management method of claim 5, wherein in the outputting of the supply voltage according to the predicted user pattern, when the load of the LDO is greater than a predetermined reference, an operation mode is the DPWM mode and when the load of the LDO is less than the predetermined reference, the operation mode is the DPSM mode.

8. A non-transitory computer-readable storage medium storing instructions that, when executed by the AI controller, configure the AI controller to perform the method of claim 5.

* * * * *